March 15, 1927.  1,620,737
E. A. PETERSON
PARTITION HOLDING CLIP
Filed March 10, 1923
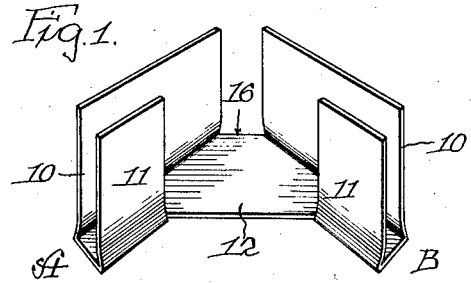
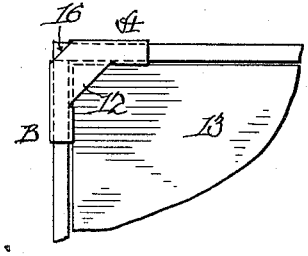 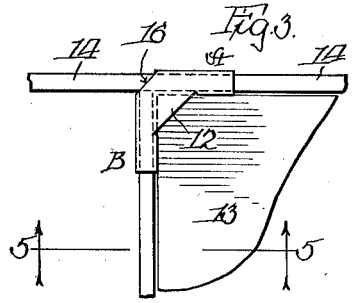
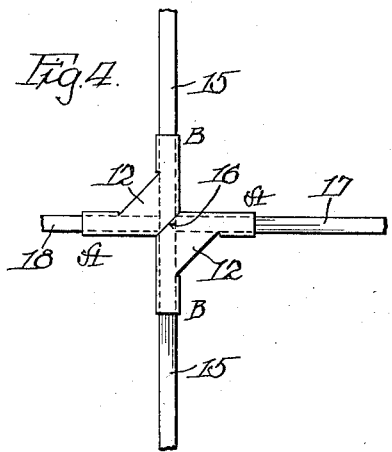 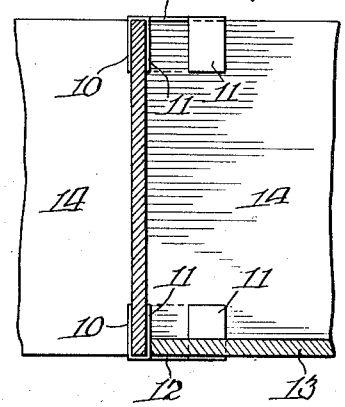
Inventor
Emil A. Peterson
By Luther Johns
Atty Patented Mar. 15, 1927.

1,620,737

UNITED STATES PATENT OFFICE.

EMIL A. PETERSON, OF CHICAGO, ILLINOIS.

PARTITION-HOLDING CLIP.

Application filed March 10, 1923. Serial No. 624,092.

My present invention relates to fasteners or clips for use in joining partitions and in forming trays such as are suitable in desk drawers and for various other purposes. Its chief objects are to provide means for holding or securing such partitions together firmly and yet adjustably and also readily separably, and all in an easy, simple and convenient way; to provide a form of clip or fastener capable of use in forming a large variety of combinations of partitions, and one which will hold a bottom also, thus providing a tray; to provide a partition-holding clip which will occupy but small space and be of neat appearance; and to provide a fastener of this class which may be cheaply made and which is strong and durable and capable of use many times as any particular form of the partition structure may be desired to be altered. Other objects and advantages will appear hereinafter.

In the accompanying drawings, which form a part of this specification, Figure 1 is a perspective, on a greatly enlarged scale, showing the inner surfaces of my new clip; Figs. 2, 3 and 4 are top views showing various applications of the clip to partition structures; and Fig. 5 is a fragmentary sectional view, as on the line 5—5 of Fig. 3, showing partition structures in sectional and side elevation.

The clip is preferably formed from flat sheet spring metal, such as hard brass or steel, and steel is preferable because its strength and springiness makes possible the use of quite thin material—considerably less than the thickness of ordinary tin plate— for use in devices adapted to hold partitions suitable for the drawers of desks and in similar situations where the partitions are not subjected to severe strains. The metal is first blanked out in a shape readily determinable from Fig. 1, and the side members are then merely turned up substantially at right angles in the form shown.

The structure of Fig. 1 consists of two partition-holding parts A and B arranged at right angles to each other and forming substantially an L-shaped structure. Each of these parts A and B is substantially U-shaped as viewed toward the free end, and this shape results from an outer side member 10 and an inner side member 11 extending away from what may be termed the body and lying in planes which are parallel to each other except that preferably these side members 10 and 11 are sprung toward each other in the forming operation sufficiently to develop a substantial amount of spring pressure when the clip is normally applied to a partition with the partition between these side members. The inner side members 11 terminate at the integral corner piece 12, part of the body, and which is provided both to strengthen the structure and to furnish a seat for the corner of a bottom as 13, Fig. 5.

The side members 10 and 11 terminate sufficiently short of where the planes of the outer side members 10 intersect each other to provide a passageway at the corner of the device through which a partition such as 14, Fig. 3, or 15, Fig. 4, may extend, whether such partition is held by one pair 10—11 of the side members or the other. The metal of the body at the corner is cut away at 16 at an angle of about 135 degrees with respect to either side member 10, which provides that two such clips may be brought together as in Fig. 4 with a neat fit to form intersecting and crossing partitions. In that instance the partition 15 is to be considered as continuous at the intersection while the partitions 17 and 18 terminate at opposite sides of the partition 15.

The clip device will ordinarily be used at both the top and bottom of the partition structure at the various intersections or abutments, as shown in Fig. 5, whether a bottom such as 13 be used or omitted, and the partition structure is thus held together quite strongly.

Since the clips are merely frictionally held upon the partitions the size of compartments formed by lateral and cross partitions may be varied by merely shifting slidably the cross partitions. The parts are held together so firmly that the entire partition structure may be lifted bodily out of a desk drawer for cleaning the drawer or for varying the shape of the comparments or for other purposes.

It is possible with this device to build up a very elaborate system of partitions in an exceedingly simple, easy and expeditious way, and at any time it may be desired to dispense with the use of such a partition structure it may readily be taken apart and put away in a comparatively small box or package for further use.

Means are thus provided also for expeditiously building up for temporary use a partition structure which may cover substantially the entire top surface of a table or desk, or as much thereof as may be desirable, to be used in sorting materials, the entire structure being readily disassembled and put away until the next occasion for its use arises. The device has important advantages also in shops and factories where it frequently becomes desirable to have a partition structure for small parts. It is important also in stores where it is frequently desired to have a partition structure in a show case for holding small objects such as jewelry or what are ordinarily described as notions. Still other instances of advantageous use of such a device exist.

The partition material may consist of wood, cardboard, etc. in strip form, but I preferably use what is known as composition board, which is strong and durable and may readily be supplied in all suitable lengths and widths.

I contemplate as being included in this invention such modifications of and departures from what is specifically herein illustrated and described as fall within the scope of the appended claim.

I claim:

A partition-holding clip of the character described comprising a single piece of flat spring metal formed with a pair of partition-holding parts extending at right angles to each other and forming substantially an L-shaped structure as viewed from the top, each of said parts being substantially U-shaped as viewed from the end thereof and each having a top member an outer side member and an inner side member, the respective inner and outer side members being spaced apart and formed to hold a partition between them by spring pressure, the side members of each of said U-shaped parts terminating sufficiently short of the place where the planes of the outer side members intersect each other to provide a passageway within which such partition may be accommodated and through which it may extend when normally engaged by either of said U-shaped parts, the top members being connected by a diagonal integral corner piece.

EMIL A. PETERSON.